Feb. 18, 1958   P. S. BRAWLEY   2,823,459
RING GROOVE MEASURING DEVICE
Filed March 14, 1955   2 Sheets-Sheet 1
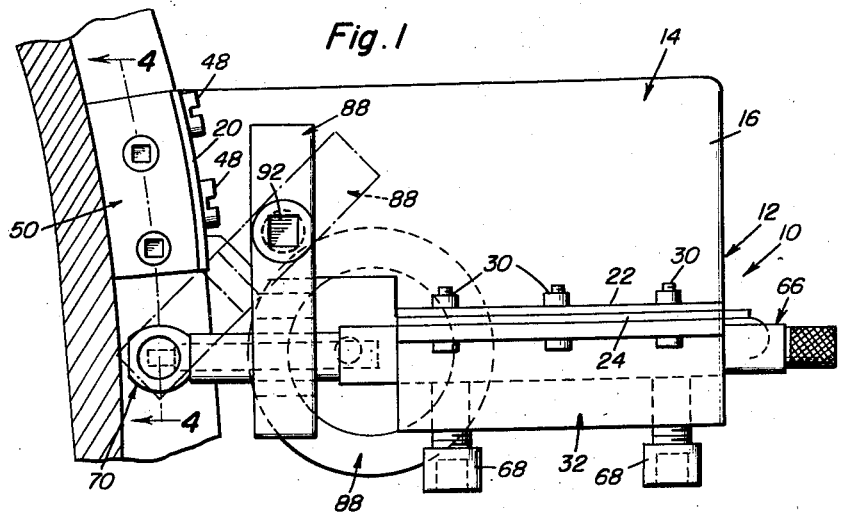
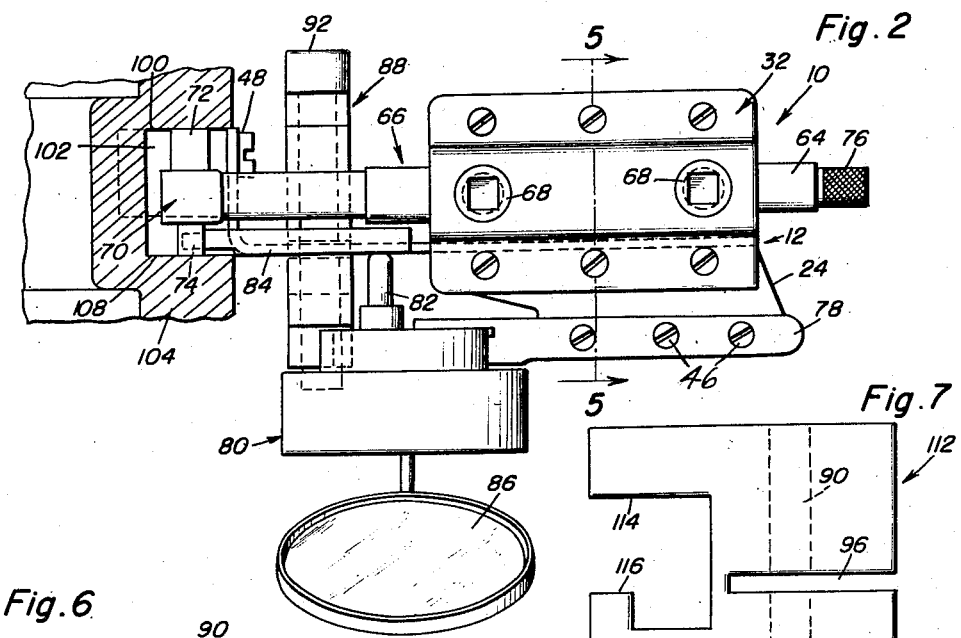
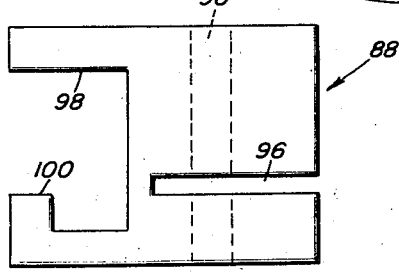
Price S. Brawley
INVENTOR.
BY *Clarence A. O'Brien*
*and Harvey B. Jacobson*
Attorneys Feb. 18, 1958　　　P. S. BRAWLEY　　　2,823,459
RING GROOVE MEASURING DEVICE
Filed March 14, 1955　　　　2 Sheets-Sheet 2
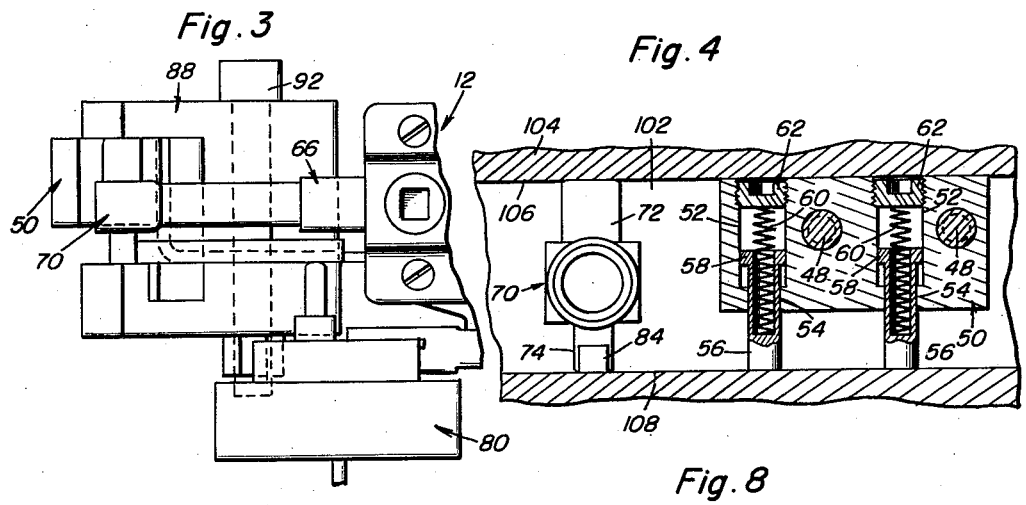
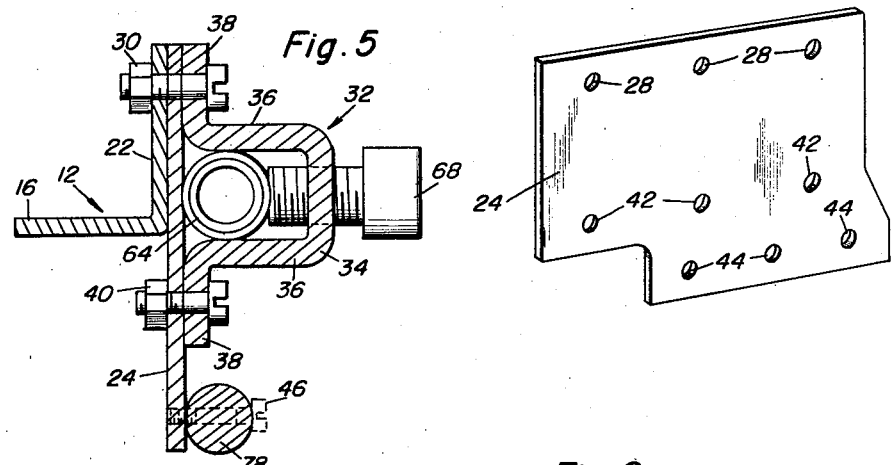
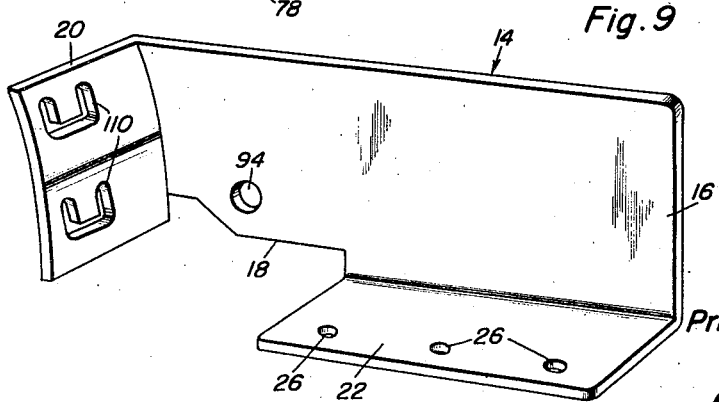
Price S. Brawley
INVENTOR.

United States Patent Office

2,823,459
Patented Feb. 18, 1958

2,823,459

RING GROOVE MEASURING DEVICE

Price S. Brawley, Mooresville, N. C.

Application March 14, 1955, Serial No. 494,091

6 Claims. (Cl. 33—147)

This invention relates in general to new and useful improvements in measuring devices, and more specifically to an improved ring groove measuring device.

When ring grooves are first machined, they are provided with upper and lower walls which are spaced apart a predetermined distance. However, after a piston having the ring grooves formed therein has been in use a long period of time, the rings in their normal flexing action result in wear in the ring groove walls. Therefore, when a piston is checked it is necessary to measure the ring groove wall in order to ascertain the wear therein. This cannot be accomplished by spot checking the distance between the ring groove walls inasmuch as the walls will wear unevenly about their circumference.

It is therefore the primary object of this invention to provide a ring groove measuring device which is so constructed whereby it may be moved about a piston in a ring groove thereof and will automatically register any deflection of the walls of the ring groove from their normal spacing.

Another object of this invention is to provide a ring groove measuring device which includes a measuring head which may be preset to the normal spacing between ring groove walls and which may be released after being positioned between ring groove walls and will automatically register on an indicator the variance in the ring groove walls from the normal.

Still another object of this invention is to provide an improved ring groove measuring device which utilizes a special frame and follower which incorporates therein a conventional telescoping gauge and dial indicator for effecting the measuring of the ring groove.

A further object of this invention is to provide an improved ring groove measuring device which has certain parts thereof replaceable whereby the ring grooves of various heights or widths may be measured as desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a sectional view through a ring groove of a piston and shows the ring groove measuring device in position for measuring the width of the ring groove, only a portion of the piston being shown and a gauge for the measuring head of the measuring device being shown in a measuring head set in position by broken lines;

Figure 2 is a front elevational view of the ring groove measuring device of Figure 1 and shows its relative position with respect to a ring groove, a portion of the piston in which the ring groove is formed being shown in section;

Figure 3 is a fragmentary front elevational view similar to Figure 2 with the device removed from the ring groove and the gauge swung around in position for setting the measuring head of the measuring device;

Figure 4 is an enlarged fragmentary vertical sectional view taken substantially upon the general plane of the section line 4—4 of Figure 1 and shows the specific details of construction of the follower and its relationship to the measuring head;

Figure 5 is an enlarged fragmentary vertical sectional view taken substantially upon the plane indicated by the section line 5—5 of Figure 2 and shows the specific details of the structure of the frame of the measuring device and the manner in which the various sections thereof are connected together, also being illustrated is the manner in which the measuring head and the indicator are secured to the frame;

Figure 6 is a side elevational view of the gauge of Figure 1;

Figure 7 is a side elevational view of the replaceable gauge utilized when narrower ring grooves are being measured;

Figure 8 is a perspective view of one of the sections of the frame; and

Figure 9 is a rotated perspective view of another of the sections of the frame.

Referring now to the drawings in detail, it will be seen that there is illustrated in Figures 1 and 2, the ring groove measuring device which is the subject of this invention, the ring groove measuring device being referred to in general by the reference numeral 10. The ring groove measuring device 10 includes a supporting frame which is referred to in general by the reference numeral 12.

The supporting frame 12 includes a first section which is referred to in general by the reference numeral 14. The first section includes a generally rectangular base 16 having a cut-out portion 18 adjacent one corner thereof. Disposed at one end of the base 16 is an arcuate, upstanding flange 20. Disposed along a side edge of the base 16 intermediate the cut-out portion 18 is an upstanding flange 22.

Referring now to Figure 5 in particular, it will be seen that there is secured to the upstanding flange 22 in face-to-face relation a second frame section 24 which is in the form of a plate. The upstanding flange 22 is provided with a plurality of apertures 26 which are aligned with apertures 28 in the plate section 24. Received through the apertures 26 and 28 are suitable fasteners 30. It is to be noted that the plate section 24 depends below the base 16.

Secured to the second plate section 24 is a channel-shaped third frame section which is referred to by the reference numeral 32. The channel-shaped frame section 32 includes a web 34 and a pair of spaced parallel flanges 36. The flanges 36 terminate in wing flanges 38 which are disposed in face-to-face engagement with the plate section 24. One of the wing flanges 38 is secured in position by fasteners 30 and the other is secured to the second section 24 by fasteners 40. The fasteners 40 pass through suitable apertures 42 formed in the plate section 24.

The plate section 24 also includes a lowermost row of apertures 44. The apertures 44 are internally threaded and have received therein suitable fasteners 46.

As is best illustrated in Figure 1, there is secured to the flange 20 by suitable fasteners 48 a follower which is referred to in general by the reference numeral 50. The follower 50 is arcuate in plane and generally rectangular in cross section. Extending vertically through the follower 50 are vertical bores 52 which have reduced lower portions 54. Extending downwardly through the lower portions 54 are extendable portions 56 of the follower 50. The extendable portions 56 are provided at their upper ends with shoulders 58 to retain them in the bores 52 and are urged downwardly by suitable springs 60. The springs 60 and the portions 56 are retained in the bores 52 by removable plugs 62.

Disposed within the general confines of the channel-shaped third frame section 32 is a handle portion 64 of a telescoping gauge which is referred to in general by the refernce numeral 66. The telescoping gauge 66 is retained in adjusted position with respect to the supporting frame 12 through the use of suitable set screws 68 threadedly carried by the web 34 and forcing the handle 64 against the plate section 24. It is to be noted that the flanges 36 are spaced apart a distance equal to the diameter of the handle 64 in order that it may be properly positioned with respect to the supporting frame 12.

The telescoping gauge 66 includes a measuring head which is referred to in general by the reference numeral 70. The measuring head includes a fixed finger 72 and a movable finger 74, the finger 74 being spring urged away from the finger 72. The telescoping gauge 66 also includes a control rod 76 for locking the movable finger 74 in an adjusted position.

Secured to the plate section 24 by the fasteners 46 is a support 78 for a dial indicator which is referred to in general by the reference numeral 80. The dial indicator 80 includes a plunger 82. Overlying the plunger 82 is a transmitting rod 84 which is carried by the movable finger 74. Inasmuch as the dial of the dial indicator 80 is inverted, there is carried by the body of the dial indicator an inverted mirror 86 which permits the reading of the dial indicator 80 in an upright position.

In order that the measuring head 70 may be properly set, there is provided a gauge which is referred to in general by the reference numeral 88. The gauge 88 is provided with a vertical bore 90 receiving a fastener 92 pivotally connecting the gauge 88 to the base 16, the fastener passing through an aperture 94 in the base 16. It is to be pointed out that the gauge 88 is provided with a slot 96 through which the base 16 passes.

In order that the gauge 88 may be utilized in setting the measuring head 70, it includes an upper gauge surface 98 which is spaced from a lower gauge surface 100 a distance equal to the width of a ring groove to be measured. The upper surface 98 is also disposed coplanar with the upper surface of the follower 50 and the upper end of the fixed finger 72.

In the operation of the present invention, the measuring head 70 is first set by swinging the gauge 88 to its broken line position of Figure 1 wherein it is in alignment with the fingers 72 and 74. Then the locking rod 76 is released so that the movable finger 74 engages the surface 100. Next the locking rod 76 is locked and the dial indicator 80 set to zero position. This having been accomplished, the gauge 88 is moved to its full line position of Figure 1 and both the follower 50 and the measuring head 70 are moved into a ring groove 102 to be measured. The ring groove 102 is formed in a piston 104 which includes an upper wall 106 and a lower wall 108. Inasmuch as the upper wall of a ring groove has very slight wear, it is utilized as the reference surface in the measuring of the ring groove 102. Thus both the upper surface of the follower 50 and the upper end of the fixed finger 72 are moved into engagement with the upper wall 106. The spring urged extensions 56 of the follower 50 engage the lower wall 108 as is best illustrated in Figure 4. The lower end of the movable finger 74 also engages the lower wall 108. The ring groove measuring device 10 is then moved with respect to the piston 104 around the ring groove 102 and any variation in width of the ring groove 102 may be easily read from the dial indicator 80 through the mirror 86. It may then be determined whether the wear in the ring groove 102 is excessive and therefore will require re-machining thereof.

In many instances the piston will have two sizes of ring grooves. Therefore, it is highly desirable that the ring groove measuring device can be adjustable to accommodate both of these ring grooves. Accordingly, the flange of the first section 14 is provided with C-shaped openings 110 through which the fasteners 48 pass. By positioning the fasteners 48 in the uppermost legs of the recesses 110, a first size of ring groove may be measured. By moving the fasteners 48 down in the lower legs of the recesses 110, the follower 50 may be dropped and a lesser height ring groove may be measured.

Inasmuch as the upper end of the fixed finger of the measuring head 70 must remain coplanar with the follower 50, when the follower 50 is lowered to measure ring grooves of lesser width, it is necessary to replace the fixed finger 72. This is accomplished by replacing the entire measuring head by a conventional measuring head of a different size. The measuring heads, such as 70, (of a telescoping gauge such as 66) are normally found in sets. It is also necessary to replace the gauge 88 with a gauge 112 which is best illustrated in Figure 7. The gauge 112 is very similar to the gauge 88 and includes a bore 90 for receiving the fastener 92. It is also provided with a slot 96 for receiving the base 16.

The opposite end of the gauge 88 includes an upper gauge surface 114 and a lower gauge surface 116. The lower gauge surface 116 is identical with the gauge surface 100. However, the gauge surface 114 is moved downwardly with respect to the gauge surface 98 the same distance as the upper surface of the follower 50. Thus the gauge 112 may be utilized for checking the upper surface of the follower 50 and the fixed finger of the replacement measuring head.

From the foregoing description of the invention, it will be readily apparent that the supporting frame 12 and the follower 50 are formed of relatively simple material and that the remainder of the measuring device is in the form of accurate measuring devices, which while they are expensive, are normally found in the average shop and are required in the measuring of various parts. Accordingly, it will be readily apparent that the ring gauge measuring device, while it is very accurate, is relatively cheap to manufacture.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. A ring groove measuring device comprising a frame, a follower carried by said frame having a wall engaging surface for guided engagement with a ring groove wall, a measuring head carried by said frame adjacent said follower, said measuring head including a fixed finger coplanar with said wall engaging surface for engaging the ring groove wall, and a spring urged movable finger for engaging an opposite ring groove wall, and an indicator carried by said frame, means connecting said movable finger to said indicator, and means adjustably mounting said follower whereby ring grooves of different heights may be measured.

2. A ring groove measuring device comprising a frame, a follower carried by said frame having a wall engaging surface for guided engagement with a ring groove wall, a measuring head carried by said frame adjacent said follower, said measuring head including a fixed finger coplanar with said wall engaging surface for engaging the ring groove wall, and a spring urged movable finger for engaging an opposite ring groove wall, and an indicator carried by said frame, means connecting said movable finger to said indicator, said follower having spring urged extensions retaining said wall engaging surface in engagement with the first mentioned ring groove wall.

3. A ring groove measuring device comprising a frame, a follower carried by said frame having a wall engaging surface for guided engagement with a ring groove wall, a measuring head carried by said frame adjacent said follower, said measuring head including a fixed finger coplanar with said wall engaging surface for engaging the ring groove wall, and a spring urged movable finger for engaging an opposite ring groove wall, and an indicator carried by said frame, means connecting said movable finger to said indicator, said follower being adjustably supported by said frame, said movable finger being replaceable whereby ring grooves of various heights may be measured.

4. A ring groove measuring device comprising a frame, a follower carried by said frame having a wall engaging surface for guided engagement with a ring groove wall, a measuring head carried by said frame adjacent said follower, said measuring head including a fixed finger coplanar with said wall engaging surface for engaging the ring groove wall, and a spring urged movable finger for engaging an opposite ring groove wall, and an indicator carried by said frame, means connecting said movable finger to said indicator, said follower being adjustably supported by said frame, said movable finger being replaceable whereby ring grooves of various heights may be measured, said follower being secured to said frame by a plurality of fasteners, said frame having C-shaped slots receiving said fasteners to adjustably position said fasteners and said follower.

5. A ring groove measuring device comprising a frame, a follower carried by said frame having a wall engaging surface for guided engagement with a ring groove wall, a measuring head carried by said frame adjacent said follower, said measuring head including a fixed finger coplanar with said wall engaging surface for engaging the ring groove wall, and a spring urged movable finger for engaging an opposite ring groove wall, and an indicator carried by said frame, means connecting said movable finger to said indicator, a gauge for setting said measuring head, said gauge being pivotally secured to said frame for selective alignment with said fingers.

6. A ring groove measuring device comprising a frame, a follower carried by said frame having a wall engaging surface for guided engagement with a ring groove wall, a measuring head carried by said frame adjacent said follower, said measuring head including a fixed finger coplanar with said wall engaging surface for engaging the ring groove wall, and a spring urged movable finger for engaging an opposite ring groove wall, and an indicator carried by said frame, means connecting said movable finger to said indicator, said frame being formed in sections, a first section carrying said follower, a second section connected to said first section and carrying said indicator, and a third section secured to said second section carrying said measuring head.

References Cited in the file of this patent

UNITED STATES PATENTS

| Number | Name | Date |
|---|---|---|
| 1,257,483 | Hart et al. | Feb. 26, 1918 |
| 1,431,613 | Wittner | Oct. 10, 1922 |
| 1,899,920 | Litterio | Feb. 28, 1933 |
| 2,229,748 | Lawrence | Jan. 28, 1941 |
| 2,547,364 | Boat | Apr. 3, 1951 |
| 2,564,994 | Phillips et al. | Aug. 21, 1951 |